(12) United States Patent
Stafford et al.

(10) Patent No.: US 9,037,824 B2
(45) Date of Patent: May 19, 2015

(54) PASSWORD ACCESSIBLE MICROELECTRONIC MEMORY

(75) Inventors: William Stafford, Folsom, CA (US);
Todd Legler, Shingle Springs, CA (US);
David Kiss, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 506 days.

(21) Appl. No.: 12/411,453

(22) Filed: Mar. 26, 2009

(65) Prior Publication Data

US 2010/0250887 A1    Sep. 30, 2010

(51) Int. Cl.
*G06F 12/14* (2006.01)

(52) U.S. Cl.
CPC ................................. *G06F 12/1441* (2013.01)

(58) Field of Classification Search
None
See application file for complete search history.

(56) References Cited

U.S. PATENT DOCUMENTS

| | | | | |
|---|---|---|---|---|
| 5,226,137 A * | 7/1993 | Bolan et al. | ................... | 711/164 |
| 5,619,066 A * | 4/1997 | Curry et al. | ................... | 257/679 |
| 5,698,836 A * | 12/1997 | Fujioka | ........................ | 235/492 |
| 5,719,387 A * | 2/1998 | Fujioka | ........................ | 235/492 |
| 5,842,124 A * | 11/1998 | Kenagy et al. | ................ | 455/418 |
| 6,738,903 B1 * | 5/2004 | Haines | .......................... | 713/168 |
| 2003/0167395 A1 * | 9/2003 | Chang et al. | ................... | 713/183 |
| 2004/0162932 A1 * | 8/2004 | Mizushima et al. | .......... | 711/103 |
| 2005/0005131 A1 * | 1/2005 | Yoshida et al. | ............... | 713/183 |
| 2005/0273858 A1 * | 12/2005 | Zadok et al. | ..................... | 726/24 |
| 2006/0075485 A1 * | 4/2006 | Funahashi et al. | .............. | 726/19 |
| 2006/0272011 A1 * | 11/2006 | Ide et al. | ........................... | 726/5 |
| 2007/0067590 A1 * | 3/2007 | Savagaonkar et al. | ........ | 711/163 |
| 2007/0157029 A1 * | 7/2007 | Mani | ............................. | 713/183 |
| 2007/0192634 A1 * | 8/2007 | Cheon et al. | .................. | 713/193 |
| 2008/0046997 A1 * | 2/2008 | Wang | ............................. | 726/16 |
| 2008/0244608 A1 * | 10/2008 | Daito | ........................... | 718/104 |
| 2011/0153697 A1 * | 6/2011 | Nickolov et al. | ............. | 707/827 |

OTHER PUBLICATIONS

Sergei P. Skorobogatov. "Semi-invasive attacks: A new approach to hardware security analysis." Univ. of Cambridge Comp. Lab., Tech. Rpt. #630, Apr. 2005.*

* cited by examiner

*Primary Examiner* — Matthew Bradley
*Assistant Examiner* — Daniel Bernard
(74) *Attorney, Agent, or Firm* — Dorsey & Whitney LLP

(57) ABSTRACT

A microelectronic memory may be password access protected. A controller may maintain a register with requirements for accessing particular memory locations to initiate a security protocol. A mapping may correlate which regions within a memory array are password protected. Thus, a controller can use a register and the mapping to determine whether a particular granularity of memory is password protected, what the protection is, and what protection should be implemented. As a result, in some embodiments, a programmable password protection scheme may be utilized to control a variety of different types of accesses to particular regions of a memory array.

21 Claims, 1 Drawing Sheet

PASSWORD ACCESSIBLE MICROELECTRONIC MEMORY

BACKGROUND

This relates generally to microelectronic memories.

Examples of microelectronic memories include flash memories, electrically erasable programmable read only memories, phase change memories, dynamic random access memories, and static random access memories. Each of these memories are generally accessed by a host device. In some cases, these memories may store information which is confidential or sensitive. Thus, it may be desirable to preclude unauthorized persons from accessing this information.

DETAILED DESCRIPTION

Figure 1:
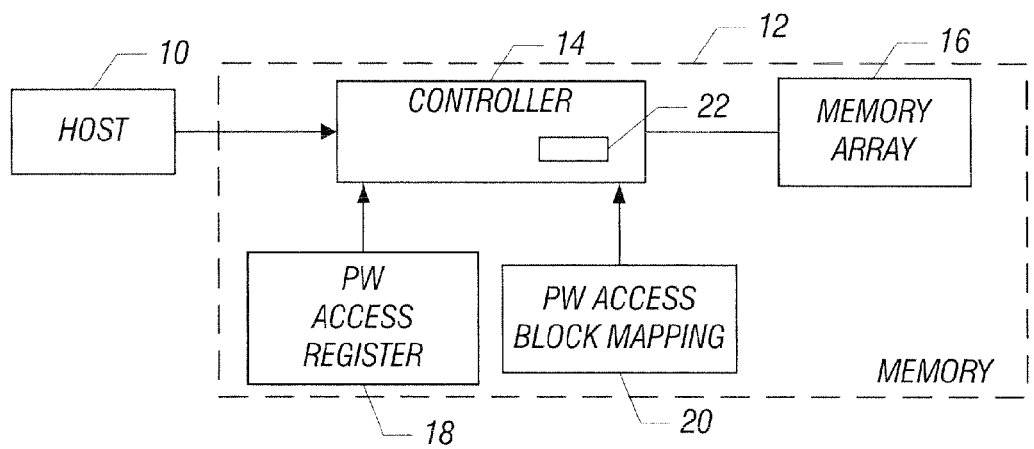
FIG. 1 is a system depiction of one embodiment.

Referring to FIG. 1, in accordance with one embodiment, a host 10 may communicate with a microelectronic memory 12. The microelectronic memory may be any type of memory, including as examples flash memories, electrically erasable programmable read only memories, phase change memories, dynamic random access memories, and static random access memories.

The host 10 may, for example, be a computer system or any processor-based system, including a personal computer, a laptop computer, a set top box, a camera, a graphics controller, a cell phone, a processor, or a controller, to mention a few examples. The memory 12 may be internal or may be external to the host 10. The memory 12 may be accessed by the host 10 to perform operations such as accessing data stored in the memory array 16, writing information to the memory array 16, and configuring or programming the controller 14 to do certain functions under command of the host 10, to mention a few examples.

In one embodiment, the controller 14 may access a password access register 18 and a password access block mapping storage 20. As used herein, a "password" is any secret code, be it a number, a pattern, or text. The password access block mapping storage 20 may indicate which blocks within the memory array 16 may be password access controlled. While blocks are described herein, the present invention is not limited to any particular granularity of the memory array. The password access register 18 may provide information about the type of access control that may be implemented by password protection. For example, in some embodiments, the password access register 18 may include bits to indicate selected password access modes.

In one embodiment, the password access register may include 16 bits. One bit may indicate whether a given granularity of the memory array, such as a particular block, is protected from even being read. For example, the bit may be a 0 or 1 to indicate whether read protection is enabled or disabled, in one embodiment.

A second bit in the register 18 may indicate whether or not a given block (or other granularity of memory) is modify protected. In such case, the block may be prevented from being changed (i.e., written to). Again, the bit may be a 1 or a 0 to indicate that this capability is either enabled or disabled.

Still another bit may indicate whether each of a plurality of blocks is permanently protected against being rewritten. Again, the bit may be a 1 or a 0 to indicate whether the permanent protection is enabled or disabled.

Still another bit may indicate whether a password is needed to update the read block lock map in mapping storage 20. Still another bit may indicate whether a password is needed to update the modify block lock map in mapping storage 20. Finally, still another bit may indicate whether a password is needed to update the permanent block lock map in mapping storage 20.

An additional two bits may indicate the password size. The password size may be 64 bits, 128 bits, or 256 bits, in some embodiments. However, different numbers of bits implementing different access controls may be used in other embodiments.

In password access read blocking, reading is prevented. In modify blocking, modifying of the stored information may be prevented, even if reading is otherwise allowed. A permanent block lock map indication indicates that the given block is permanently locked and cannot ever be modified. It may or may not be readable.

The password access block mapping storage 20 may indicate to the controller 14 which blocks (or other memory granularities) are password accessible. Once it is known that a given block (or other granularity) must be accessed with a password, the password access register 18 may be accessed to determine the type of access protection that is involved. In one embodiment, the register 18 and storage 20 may be combined in one unit.

Thus, in some embodiments, the actual data stored in the memory array may be protected with one or more passwords. Only those users who have the correct password can access the protected data. In some embodiments, even though a given block is password protected, it may be read freely, but may not be modified. Thus, the information may be read, but, in some cases, not modified. In other cases, it cannot even be read without a password.

Thus, in order to program the password protection status, commands may be provided by the host to the controller. A plurality of commands may be provided that are distinguishable, one for each of the different modes. The different password modes may include, in one embodiment, no protection enabled; permanent protection enabled; modify protection enabled; and read protection enabled; permanent protect and modify protect, both enabled; permanent protect only enabled; modify protect and read protect enabled; and modify protect only enabled. Those skilled in the art would appreciate a number of other programmable password protection modes.

Figure 2:
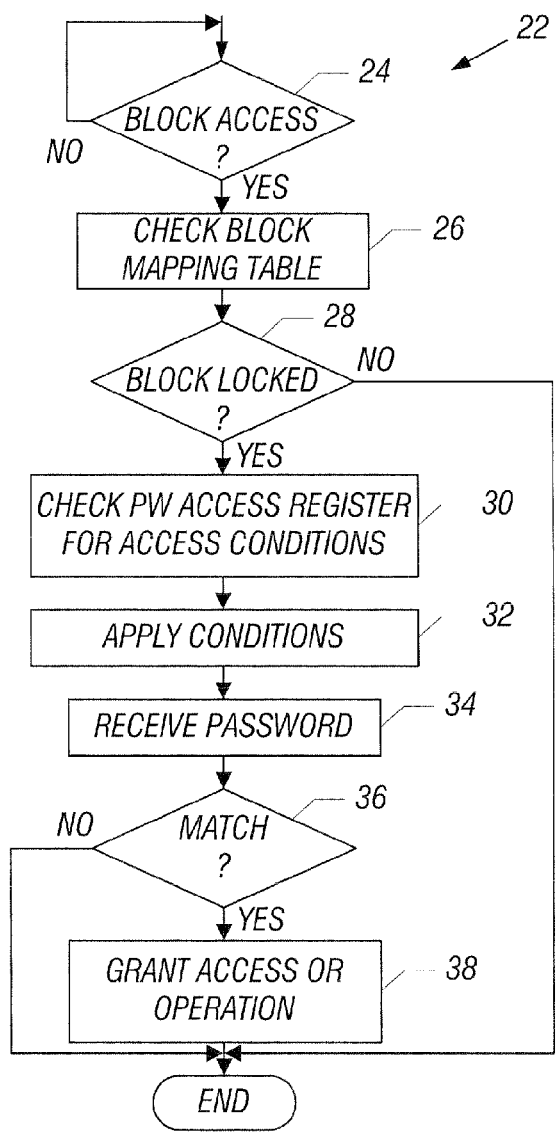
FIG. 2 is a flow chart for one embodiment.

Referring to FIG. 2, in accordance with one embodiment of the present invention, a sequence of operations may be implemented in hardware or software. In the software embodiment, the sequence may be implemented in a computer readable medium, such as the memory array 16, or a memory on board the controller 14, to mention two examples. In still other embodiments, the sequence may be implemented by the host 10.

Initially, a check at diamond 24 indicates whether or not the host 10 is attempting to access a granularity, such as a block, within the memory array 16. If so, a check of the mapping storage 20, at block 26, determines whether or not the access granularity, such as a block, is password protected. If the block is locked (i.e. password protected), as determined in diamond 28, a check of the password access register 18 determines the type of access conditions that are applicable, as indicated in block 30. The conditions may then be implemented, as indicated in block 32. These conditions may involve requesting a password via a user interface or waiting for receipt of the password for a given period of time, as two examples. When the password is received, as indicated at block 34, a comparison of the received password to a stored password is undertaken, as indicated in diamond 36. If there is a match, the access may be granted or the requested operation, such as programming the protected password mode, may be implemented.

The password may be stored in the sequence where the host programs the controller 14 with the desired access control mode, together with a password for each mode. The password may be reprogrammably stored on board the controller 24 in one embodiment.

In some embodiments, the password status may be implemented during the manufacturing process. In other embodiments, it may be programmed by appropriate commands by the first purchaser from the manufacturer. In some cases, the first purchaser is not the end user, but may set up the access passwords as desired. And, in some cases, the access limitations may be applied by the end user. Thus, different parties may be given the commands to program the desired level of password security.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, with a controller, a command of a plurality of commands from a host, each command of the plurality of commands indicative of a respective access control mode of a plurality of access control modes;
   assigning password protection to a first region of memory in response to receipt of the command, the first region included in a first memory unit;
   receiving a request to access the first region;
   in response to the request, checking a second region of memory to determine if the first region is password protected with a password, the password based on the access control mode of the plurality of access control modes; and
   in response to determining the first region is password protected:
   checking a third region of memory for access conditions of the first region, the third region included in a second memory unit separate from the first memory unit; and
   implementing the access conditions in accordance with the access control mode of the plurality of access control modes.

2. The method of claim 1, wherein implementing the access conditions comprises requiring a password to write to the first region of memory.

3. The method of claim 1, wherein implementing the access conditions comprises requiring a password to read from the first region of memory.

4. The method of claim 1, wherein checking a third region of memory for access conditions of the first region comprises accessing a password access register.

5. The method of claim 1, wherein checking a second region of memory to determine if the first region is password protected comprises accessing a password access block mapping storage.

6. The method of claim 1, further comprising enabling password protection to be controlled by a host coupled to the first region of memory.

7. The method of claim 1, wherein the plurality of password protection modes includes read protection, modify protection, permanent protection from being rewritten, and protection from modifying the mapping storage.

8. The method of claim 7, further comprising providing a command format including a plurality of bits, each bit indicating whether one of a plurality of password protection modes is enabled or disabled.

9. A non-transitory computer readable medium storing instructions that, when executed:
   receiving, with a controller, a command of a plurality of commands from a host, each command the command of the plurality of commands indicative of a respective access control mode of a plurality of access control modes;
   assign password protection to a first region of memory in response to receipt of the command, the first region of memory included in a first memory unit;
   receive a request to access the first region;
   in response to the request to access the first region, check a second region of memory to determine if the first region is password protected with a password, the password based on the access control mode of the plurality of access control modes; and
   if the first region is password protected:
   check a third region of memory for access conditions of the first region, the third region included in a second memory unit separate from the first memory unit; and
   implement the access conditions in accordance with the access control mode of the plurality of access control modes.

10. The non-transitory computer readable medium of claim 9, further storing instructions to:
    maintain a password access block mapping storage to indicate, for each of a plurality of blocks of the first region, whether they are password protected.

11. The non-transitory computer readable medium of claim 10, further storing instructions to:
    enable selection of a plurality of password protection modes including read protection, modify protection, permanent protection from being rewritten, and protection from modifying the mapping storage.

12. An apparatus comprising:
    a microelectronic memory including an array; and
    a controller coupled to the array, the controller configured to:
    assign password protection to a first region of memory in response to receipt of a command of a plurality of commands from a host, each command of the plurality of commands indicative of a respective access control mode of a plurality of access control modes;
    receive a request to access the first region;
    check a second region of memory responsive to the request to determine if the first region is password protected with a password, the password based on the access control mode of the plurality of access control modes, and if said first region is password protected, check a third region of memory for access conditions of the first region; and implement the access conditions of the first region in accordance with the access control mode of the plurality of access control modes, wherein the first region is included in a first memory unit and the third region is included in a second memory unit separate from the first memory unit.

13. The apparatus of claim 12, wherein the controller is configured to be programmed to implement different modes of password protection.

14. The apparatus of claim 12, wherein the first memory unit comprises a memory array and the second memory unit comprises a password access block mapping storage.

15. The apparatus of claim 12, wherein the second region is included in a third memory unit.

16. The apparatus of claim 12, wherein the third region comprises a password access register configured to store the access conditions.

17. The apparatus of claim 12, wherein the second region comprises a password access block mapping configured to indicate whether the first region is password protected.

18. The apparatus of claim 17, wherein the controller is configured to provide a mapping to indicate for each of a plurality of blocks within the array whether each block is password protected.

19. The apparatus of claim 18, wherein the controller is configured to enable selection of a plurality of password protection modes.

20. The apparatus of claim 19, wherein the controller is configured to receive a command and to implement one of a plurality of password protection modes responsive, at least in part, to receipt of the command.

21. The apparatus of claim 20, wherein the controller is configured to enable selection of password protection modes including read protection, modify protection, permanent protection from being rewritten, and protection from modifying the mapping of password access limitations.

* * * * *

UNITED STATES PATENT AND TRADEMARK OFFICE
CERTIFICATE OF CORRECTION

| | | |
|---|---|---|
| PATENT NO. | : 9,037,824 B2 | Page 1 of 1 |
| APPLICATION NO. | : 12/411453 | |
| DATED | : May 19, 2015 | |
| INVENTOR(S) | : William Stafford, Todd Legler and David Kiss | |

It is certified that error appears in the above-identified patent and that said Letters Patent is hereby corrected as shown below:

In the Claims

Column 4, Line 22, Claim 9    Reads: "receiving, with a"    Should Read: "receive, with a"

Signed and Sealed this
Twenty-ninth Day of September, 2015

Michelle K. Lee
*Director of the United States Patent and Trademark Office*